US012321070B2

(12) United States Patent
Miao et al.

(10) Patent No.: US 12,321,070 B2
(45) Date of Patent: Jun. 3, 2025

(54) DISPLAY SUBSTRATE AND DISPLAY DEVICE (71) Applicants: Hefei Xinsheng Optoelectronics Technology Co., Ltd., Anhui (CN); BOE TECHNOLOGY GROUP CO., LTD., Beijing (CN)

(72) Inventors: Dandan Miao, Beijing (CN); Wenming Ren, Beijing (CN); Ran Zhang, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/425,985

(22) PCT Filed: Feb. 5, 2021

(86) PCT No.: PCT/CN2021/075391
§ 371 (c)(1),
(2) Date: Jul. 1, 2022

(87) PCT Pub. No.: WO2021/164574
PCT Pub. Date: Aug. 26, 2021

(65) Prior Publication Data
US 2025/0044655 A1 Feb. 6, 2025

(30) Foreign Application Priority Data
Feb. 18, 2020 (CN) .......................... 202010097936.6

(51) Int. Cl.
*G02F 1/1362* (2006.01)

(52) U.S. Cl.
CPC .. *G02F 1/136254* (2021.01); *G02F 1/136286* (2013.01)

(58) Field of Classification Search
CPC .................... G02F 1/136254; G02F 1/136286
See application file for complete search history.

(56) References Cited

U.S. PATENT DOCUMENTS

2007/0052896 A1 3/2007 Eom et al.
2019/0064256 A1\* 2/2019 Wang ................. G01R 31/2843

FOREIGN PATENT DOCUMENTS

CN  1790593 A  6/2006
CN  102012593 A  4/2011
(Continued)

OTHER PUBLICATIONS

English Machine Translation of Hu et al CN 103 163 669 (Year: 2024).*

(Continued)

*Primary Examiner* — Donald L Raleigh
(74) *Attorney, Agent, or Firm* — HOUTTEMAN LAW LLC (57) ABSTRACT The present disclosure provides a display substrate and a display device. The display substrate includes a test area, the test area includes a plurality of signal lines coupled to signal lines in a display area of the display substrate, the signal lines are divided into a plurality of groups, each group of signal lines in at least a portion of the groups are coupled through a plurality of shorting bars, and each of the shorting bars is coupled to a same group of signal lines.

16 Claims, 5 Drawing Sheets (56) References Cited

FOREIGN PATENT DOCUMENTS

| | | | | |
|---|---|---|---|---|
| CN | 103163669 A | * | 6/2013 | ............... G02F 1/13 |
| CN | 105609025 A | | 5/2016 | |
| CN | 106601161 A | | 4/2017 | |
| CN | 106842747 A | | 6/2017 | |
| CN | 107272288 A | | 10/2017 | |
| CN | 107329298 A | | 11/2017 | |
| CN | 108490654 A | | 9/2018 | |
| CN | 111338139 A | | 6/2020 | |

OTHER PUBLICATIONS

China Patent Office, CN202010097936.6 First Office Action issued on Jul. 14, 2022.

* cited by examiner

DISPLAY SUBSTRATE AND DISPLAY DEVICE

CROSS-REFERENCE TO RELATED APPLICATIONS

The present application claims the priority of Chinese Patent Application No. 202010097936.6, filed on Feb. 18, 2020, the contents of which are incorporated herein in their entirety by reference.

TECHNICAL FIELD

The present disclosure relates to the field of display technology, and particularly relates to a display substrate and a display device.

BACKGROUND

In a process of manufacturing a display substrate, a test is generally required so that a problem occurring in the process of manufacturing the display substrate is detected in time. Modes for testing include, for example, a shorting bar test, a full contact test, and an all short test.

SUMMARY

An embodiment of the present disclosure provides a display substrate, including a test area, where the test area includes a plurality of signal lines coupled to signal lines in a display area of the display substrate, the plurality of signal lines are divided into a plurality of groups, each group of signal lines in at least a portion of the groups are coupled through a plurality of shorting bars, and each of the shorting bars is coupled to a same group of the signal lines.

In some implementations, the shorting bars coupled to the same group of signal lines are arranged adjacent to each other and in parallel.

In some implementations, each of the signal lines extends along a first direction, the plurality of signal lines are arranged in parallel along a second direction, and each of the shorting bars extends along the second direction, the first direction crossing the second direction.

In some implementations, each shorting bar has a width, along the first direction, ranging from about 17 microns to about 25 microns.

In some implementations, the signal lines are disposed in a same layer, the shorting bars are disposed in a same layer, the display substrate further includes an interlayer insulating layer disposed between the signal lines and the shorting bars, and conductive parts corresponding to the signal lines, the shorting bars are disposed between the signal lines and the conductive parts, and each of the conductive parts is coupled to the shorting bars coupled to the same group of signal lines and the corresponding signal line through via holes penetrating through the interlayer insulating layer and the shorting bars.

In some implementations, both ends of each of the conductive parts are coupled to the corresponding signal line through redundant via holes penetrating through only the interlayer insulating layer, respectively.

In some implementations, for the shorting bars adjacent to each other and respectively coupled to a first group of signal lines and a second group of signal lines, notches are provided at positions of an end of the shorting bar, coupled to the first group of signal lines, which is proximal to the conductive parts coupled to the second group of signal lines.

In some implementations, a material of the conductive parts includes indium tin oxide.

An embodiment of the present disclosure further provides a display substrate, including a test area, where the test area includes a plurality of signal lines coupled to signal line in a display area of display substrate, the plurality of signal lines are divided into a plurality of groups, each group of signal lines in at least a portion of the groups are coupled through a plurality of shorting bars, and each of the shorting bars coupled to a same group of signal lines includes a plurality of segments decoupled from each other, and each of the segments is coupled to one of the signal lines.

In some implementations, adjacent segments of each of the shorting bars are decoupled from each other between the signal lines adjacent to each other.

An embodiment of the present disclosure further provides a display device, including the display substrate described above.

DESCRIPTION OF EMBODIMENTS

In order that those skilled in the art will better understand the technical solutions of the present disclosure, the following detailed description is given with reference to the accompanying drawings and the specific embodiments.

In the related art, modes for testing a display substrate include, for example, a shorting bar test mode, a full contact test mode, and a full short circuit test mode, and in order to reduce test cost, the shorting bar test mode may be used to test the display substrate.

Figure 1:
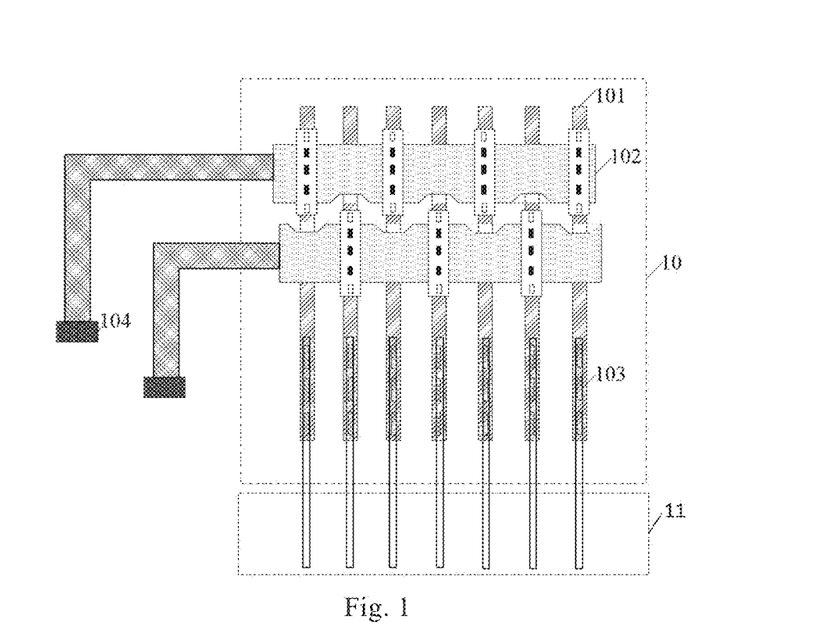
FIG. 1 is a schematic plan view illustrating a display substrate according to an embodiment of the present disclosure.

FIG. 1 is a schematic plan view illustrating a display substrate according to an embodiment of the present disclosure, and as shown in FIG. 1, the display substrate includes a test area 10, the test area 10 includes a plurality of signal lines 101, the plurality of signal lines 101 are divided into a plurality of groups, and each group of signal lines 101 are coupled through one shorting bar 102.

In some implementations, the plurality of signal lines 101 may be arranged in parallel, each signal line 101 may be coupled to a display area 11 of the display substrate through a bonding pad 103, specifically, may be coupled to a signal line within the display area 11, and each shorting bar 102 may be coupled to a test pad 104.

Specifically, each signal line 101 may extend along a first direction, the plurality of signal lines 101 may be arranged in parallel along a second direction and sequentially numbered, the odd-numbered signal lines 101 may be grouped together, and the even-numbered signal lines 101 may be grouped together, so that the odd-numbered signal lines 101 may be coupled by one shorting bar 102 and the even-numbered signal lines 101 may be coupled by another shorting bar 102, each shorting bar 102 may extend along the second direction, and the first direction crosses (e.g., may be perpendicular to) the second direction.

In some implementations, each shorting bar 102 may have a width, along the first direction (i.e., an extending direction of the signal line 101), of about 73 micrometers or more, specifically, may have a width of about 73 micrometers, and a width (i.e., a dimension perpendicular to the extending direction thereof) of each signal line 101 may range from about 8.5 micrometers to 15 micrometers.

It should be understood that, in the embodiment, shorting bars 102 respectively coupled to the groups of signal lines 101 may be the same or different, which is not specifically limited in the present disclosure, but it may be easier to prepare the shorting bars 102 to be the same.

When the display substrate of the embodiment is tested, a driving signal may be applied to the signal lines 101 in the test area 10 and signal lines in the display area 11 of the display substrate through the shorting bar 102 with a relatively large area by the test pad 104, so as to drive each pixel in the display area 11 to perform display, thereby implementing the test on the display substrate. After the test is completed, each shorting bar 102 needs to be cut to decouple the signal lines 101, coupled to the shorting bar 102, from each other. Specifically, the shorting bar 102 may be cut along gaps between the signal lines 101 adjacent to each other. Since an area of the shorting bar 102 is relatively large, a large amount of metal dust is easily generated during a process of cutting, and the metal dust easily falls back to the display substrate along with airflow, for example, falls back to the bonding pad 103, which may cause a circuit defect in the area, thereby increasing a risk of product defect. Moreover, since the area of the shorting bar 102 is relatively large, a large amount of energy is required to cut the shorting bar 102 during the process of cutting, which easily affects service life of a cutting device.

Figure 2A:
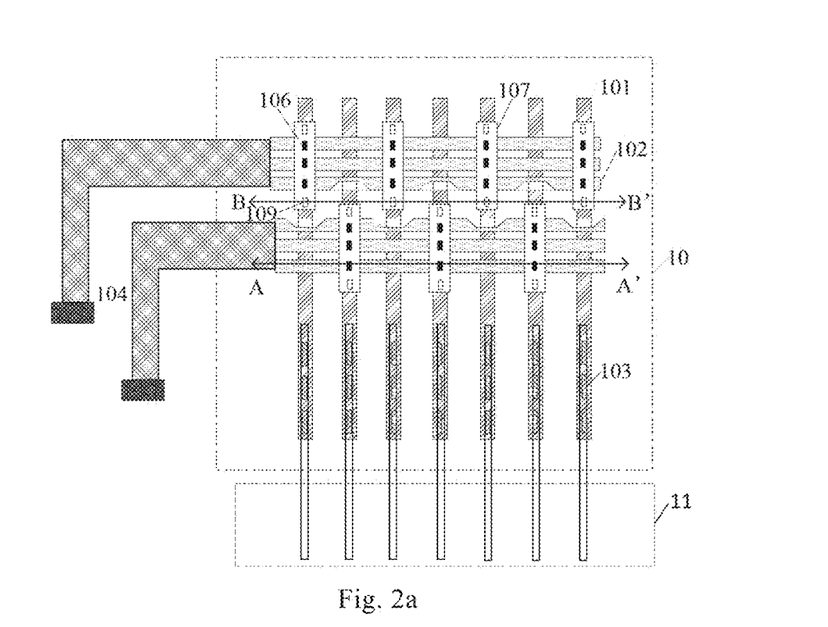
FIG. 2a and FIG. 2b are schematic plane views illustrating a display substrate according to an embodiment of the present disclosure.
Figure 2B:
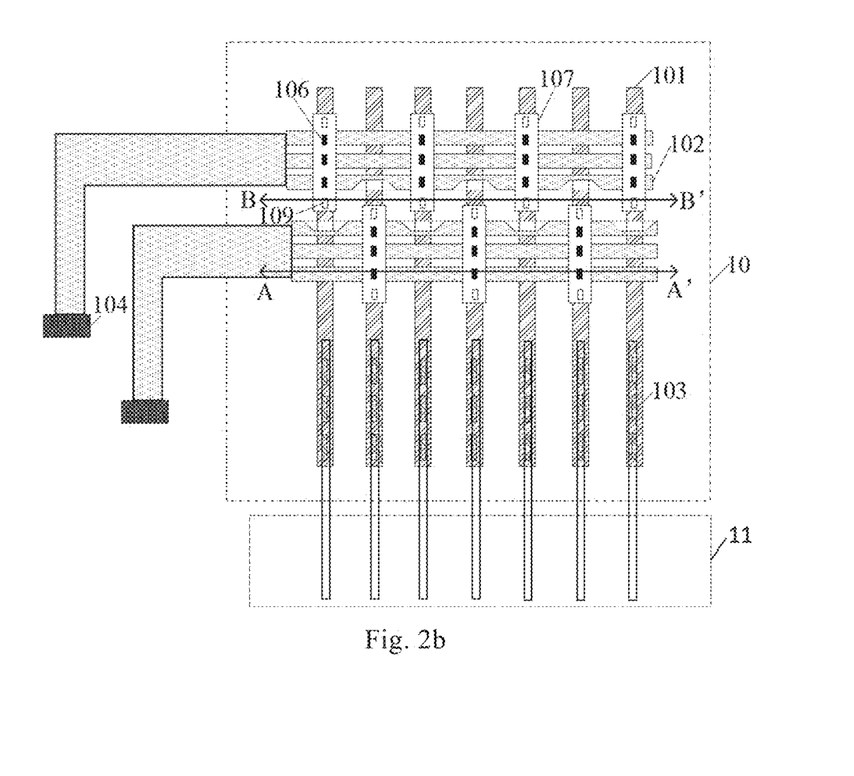

FIG. 2a and FIG. 2b are schematic plane views illustrating a display substrate according to an embodiment of the present disclosure, and as shown in FIG. 2a and FIG. 2b, the display substrate includes a test area 10, a plurality of signal lines 101 are included in the test area 10, the plurality of signal lines 101 are divided into a plurality of groups, and each group of signal lines in at least a portion of the groups are coupled by a plurality of shorting bars 102.

In the present embodiment, the plurality of shorting bars 102 coupled to the same group of signal lines 101 may be arranged in parallel, and each shorting bar 102 is coupled to the same group of signal lines 101.

In some implementations, the plurality of signal lines 101 may be arranged in parallel, each signal line 101 may be coupled to the display area 11 of the display substrate through a bonding pad 103, and specifically, each signal line 101 in the test area 10 may be bonded and coupled to a signal line in the display area 11 through the bonding pad 103, and meanwhile, one end of each shorting bar 102 may be led out and coupled to a test pad 104.

In the process of testing the display substrate of the present embodiment, a driving signal may be applied to the signal lines 101 in the test area 10 and the signal lines in the display area 11 of the display substrate through the test pad 104 to drive each pixel in the display area 11 to perform display, so as to implement the test on the display substrate.

In the present embodiment, the same group of signal lines 101 in the test area 10 may be coupled by a plurality of (e.g., three) shorting bars 102, each signal line 101 may extend along the first direction, the plurality of signal lines 101 may be arranged in parallel along the second direction, and a width of each shorting bar 102 along the first direction (i.e., an extending direction of the signal line 101) may be relatively small.

Taking a case where the same group of signal lines 101 in the present embodiment are coupled by three shorting bars 102 as an example, the width of each shorting bar 102 in the present embodiment may be less than one third of the width of each shorting bar 102 in the previous embodiment, specifically, the width of each shorting bar 102 in the present embodiment may range from about 17 micrometers to about 25 micrometers. If a length of the shorting bar 102 (i.e., a dimension along the extending direction thereof) is constant, a sum of areas of the shorting bars 102 coupled to the same group of signal lines 101 in the present embodiment may be smaller than an area of the shorting bar 102 coupled to the same group of signal lines 101 in the previous embodiment. After the test is completed, each shorting bar 102 may be cut along gaps between the signal lines 101 adjacent to each other to decouple the signal lines 101 in the same group, so as not to affect a normal display of the display substrate. In the present embodiment, the same group of signal lines 101 are coupled through a plurality of shorting bars 102, the area of each shorting bar 102 is relatively small, and the total area of the shorting bars 102 is reduced, so that the area to be cut can be reduced, and generation of a large amount of metal dust in the process of cutting can be avoided, thereby reducing or avoiding circuit defects caused by the metal dust falling back to the bonding pad 103 along with airflow, and further improving the yield of products. Moreover, since the area to be cut is smaller, the energy consumption can be reduced in the process of cutting, and the service life of the cutting device can be prolonged.

As shown in FIG. 2a and FIG. 2b, the plurality of signal lines 101 in the embodiment may be divided into two groups, and specifically, the plurality of signal lines 101 may be sequentially numbered, the odd-numbered signal lines 101 may be in one group, and the even-numbered signal lines 101 may be in another group, so that the odd-numbered signal lines 101 may be coupled by a plurality of (e.g., three) shorting bars 102, and the even-numbered signal lines 101 may also be coupled by a plurality of (e.g., three) shorting bars 102, the plurality of shorting bars 102 coupled to the odd-numbered signal lines 101 may be arranged in parallel, the plurality of shorting bars 102 coupled to the even-numbered signal lines 101 may be arranged in parallel, and each shorting bar 102 may extend along the second direction.

As required, the signal lines 101 in the test area 10 may be made of a metal material such as copper or aluminum, and the signal lines 101 in the test area 10 each may have a width (i.e., a dimension perpendicular to the extending direction thereof) different from that (i.e., a dimension perpendicular to the extending direction thereof) of each signal line in the display area 11, and the signal lines 101 in the test area 10 each may have a width ranging from about 8.5 micrometers to about 15 micrometers. It should be noted that, in the present embodiment, the plurality of signal lines 101 may be disposed in the same layer and made of the same material as gate lines in the display area and gates of transistors in pixels in the display area, so as to reduce a thickness of the display substrate and reduce a manufacturing difficulty; the shorting bars 102 in the present embodiment may be disposed in the same layer and made of the same material as data lines in the display area and sources/drains of the transistors in the pixels in the display area, so as to reduce the thickness of the display substrate and reduce the manufacturing difficulty. Furthermore, as shown in FIG. 2a, the shorting bars 102 may be disposed in the same layer as connection lines coupled to test pads 104, and may be made of a material different from that of the connection lines; as shown in FIG. 2b, the shorting bars 102 may be disposed in the same layer as the connection lines coupled to the test pads 104, and may be made of the same material as the connection lines, so that they may be formed by a single patterning process, thereby reducing the process difficulty and reducing the contact resistance therebetween.

It should be understood that, although the signal lines 101 are divided into two groups in the display substrate provided in the present embodiment, and the same group of signal lines 101 are coupled by three shorting bars 102, the number of the shorting bars 102 coupled to the same group of signal lines 101 may be other numbers, for example, may be two, four or more, and certainly, the signal lines 101 may also be divided into other numbers of groups according to other rules, which are not described herein again.

In addition, in the present embodiment, only each group of signal liens 101 in a portion of the groups of signal lines 101 may be coupled by a plurality of shorting bars 102, the numbers of shorting bars 102 coupled to different groups of signal lines 101 may be different, and widths of the shorting bars 102 may be the same or different.

In some implementations, as shown in FIGS. 2a and 2b, the plurality of shorting bars 102 coupled to the same group of signal lines 101 are disposed adjacent to each other and in parallel.

In practical applications, in case where the plurality of shorting bars 102 coupled to the same group of signal lines 101 are arranged adjacent to each other and in parallel, in the preparation process, the plurality of shorting bars 102 coupled to the same group of signal lines 101 may be formed through a single patterning process, so that the process difficulty can be reduced, and the preparation efficiency can be improved. In some implementations, the shorting bars 102 each may be of a straight line, a curved line, or other irregular line, which is not further illustrated herein.

Figure 3:
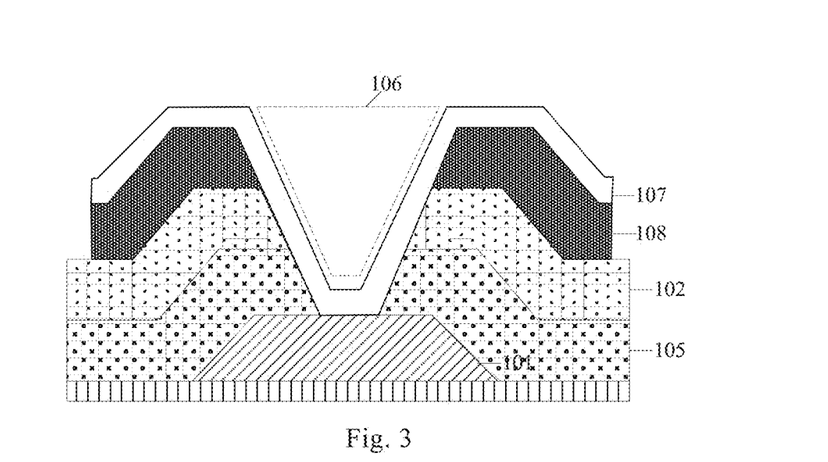
FIG. 3 is a schematic cross-sectional view of a display substrate taken along A-A' direction according to an embodiment of the present disclosure.

FIG. 3 is a schematic cross-sectional view of a display substrate taken along a direction A-A' according to an embodiment of the present disclosure. As shown in FIG. 2a, FIG. 2b and FIG. 3, the signal lines 101 may be disposed in a same layer, the shorting bars 102 may be disposed in a same layer, the display substrate may further include an interlayer insulating layer 105 disposed between the signal lines 101 and the shorting bars 102, and conductive parts 107 disposed corresponding to the signal lines 101, the shorting bars 102 may be disposed between the signal lines 101 and the conductive parts 107, the conductive parts 107 each may be coupled to the shorting bars 102 coupled to the same group of signal lines 101 and the corresponding signal line 101 through via holes 106, and the via holes 106 penetrate through the interlayer insulating layer 105 and the shorting bars 102. That is, the same group of signal lines 101 may be coupled to the corresponding shorting bars 102 through the conductive parts 107.

It should be noted that, in a case where the plurality of signal lines 101 are disposed in a same layer and the plurality of shorting bars 102 are disposed in a same layer, in the preparation process, the signal lines 101 in the same layer may be formed through a single patterning process, and the shorting bars 102 in the same layer may be formed through a single patterning process, so that the process difficulty can be reduced, and the preparation efficiency can be improved. The conductive parts 107 each are coupled to the shorting bars 102 coupled to the same group of signal lines 101 and the corresponding signal lines 101 through the via holes 106, so that the shorting bars 102 can be effectively coupled to the corresponding same group of signal lines 101. It will be appreciated that the shorting bars 102 may also be protected by covering the shorting bars 102 with a protective layer 108 thereon, and thus the via holes 106 need to further penetrate through the protective layer 108. In addition, during the manufacturing process, a material of the interlayer insulating layer 105 may be silicon nitride, and a thickness thereof may be about 4000 angstroms in general. A material of the protective layer 108 may also be silicon nitride. It is understood that materials of the interlayer insulating layer 105 and the protection layer 108 may also be selected according to actual needs, so that film layers with corresponding thicknesses are formed, which are not listed here. The conductive parts 107 may be made of the same material as the signal lines 101, so that a contact resistance between the conductive parts 107 and the signal lines 101 can be reduced, which is beneficial to improving conductivity therebetween.

Figure 4:
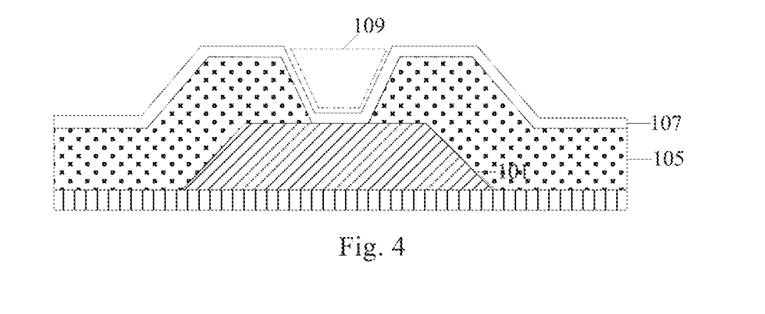
FIG. 4 is a schematic cross-sectional view of a display substrate taken along direction B-B' according to an embodiment of the present disclosure.

FIG. 4 is a schematic cross-sectional view of a display substrate taken along a direction A-A' according to an embodiment of the present disclosure. As shown in FIGS. 2a, 2b, and 4, both ends of the conductive part 107 may be coupled to the corresponding signal line 101 through redundant via holes 109 penetrating only the interlayer insulating layer 105, respectively.

In practical applications, no shorting bar 102 may be disposed at positions corresponding to both ends of the conductive part 107, and therefore, no protective layer 108 is required accordingly, and the conductive part 107 may be fixedly coupled to the signal line 101 through the redundant via holes 109 penetrating through the interlayer insulating layer 105, so as to ensure effective connection between the conductive part 107 and the signal line 101.

In some implementations, as shown in FIG. 2a and FIG. 2b, for the shorting bars 102 adjacent to each other and coupled to a first group of signal lines 101 and a second group of signal lines 101 respectively, notches are provided at positions of an end of the shorting bar 102, coupled to the first group of signal lines 101, which is proximal to the conductive parts 107 coupled to the second group of signal lines 101.

It should be noted that, in the display substrate, in order to achieve effective fixing of the conductive part 107, both ends of the conductive part 107 may be fixedly coupled to the corresponding signal line 101 through the redundant via holes 109 penetrating only the interlayer insulating layer 105, however, such arrangement may easily cause a distance between the conductive part 107 and the shorting bar 102 adjacent thereto to be relatively short while achieving the fixed connection between the conductive part 107 and the corresponding signal line 101, and even the conductive part 107 may be overlapped with the shorting bar 102 adjacent thereto through the redundant via holes 109, thereby easily generating a circuit defect. By providing a notch at a position of the end of the shorting bar 102, coupled to the first group of signal lines 101, which is proximal to the conductive part 107 coupled to the second group of signal lines 101, the notch can increase the distance between the conductive part 107 coupled to the second group of signal lines 101 and the shorting bar 102 coupled to the first group of signal lines 101, so that the conductive part 107 coupled to the second group of signal lines 101 and the shorting bar 102 coupled to the first group of signal lines 101 can be prevented from being relatively close to each other and overlapped each other, and thus, a circuit defect between the conductive part 107 coupled to the second group of signal lines 101 and the shorting bar 102 coupled to the first group of signal lines 101 can be prevented from occurring. It is understood that the notch may have a trapezoidal shape, or may have other shapes, which are not listed here.

In some implementations, a material of the conductive parts 107 includes indium tin oxide.

It should be noted that the conductive parts 107 may be made of indium tin oxide with a good conductivity. It is understood that the conductive parts 107 may also be made of other semiconductor materials or metal materials with conductive properties, which are not listed here.

It should be noted that, in the embodiment, the same group of signal lines 101 are coupled by a plurality of shorting bars 102, and the width of each shorting bar 102 (i.e. the dimension along the extending direction of the signal line 101) may range from about 17 micrometers to about 25 micrometers, taking a case where the same group of signal lines 101 are coupled by three shorting bars 102 arranged in parallel as an example, the width of each shorting bar 102 may be about 17 micrometers, and compared with the single shorting bar 102 having a width of about 73 micrometers and coupled to the same group of signal lines 101 in the previous embodiment, it can be seen that the total width of the three shorting bars 102 coupled to the same group of signal lines 101 in the display substrate provided by the present embodiment is significantly lower than the width of the single shorting bar 102 coupled to the same group of signal lines 101 in the display substrate of the previous embodiment, therefore, the area to be cut can be reduced during the process of cutting the shorting bars 102 after the test is completed, thereby reducing or avoiding a large amount of metal dust generated during the process of cutting, therefore, circuit defects caused by the metal dust falling back to the bonding pad 103 along with airflow can be reduced or avoided, and the product yield can be improved.

Figure 5A:
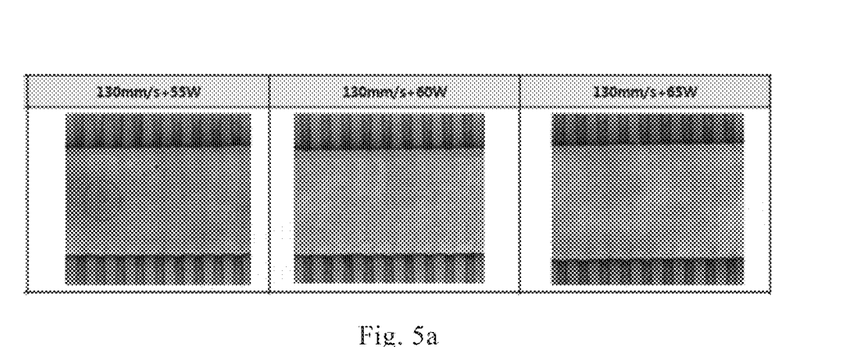
FIG. 5a is a schematic diagram illustrating a verification effect of a display substrate according to an embodiment of the present disclosure.
Figure 5B:
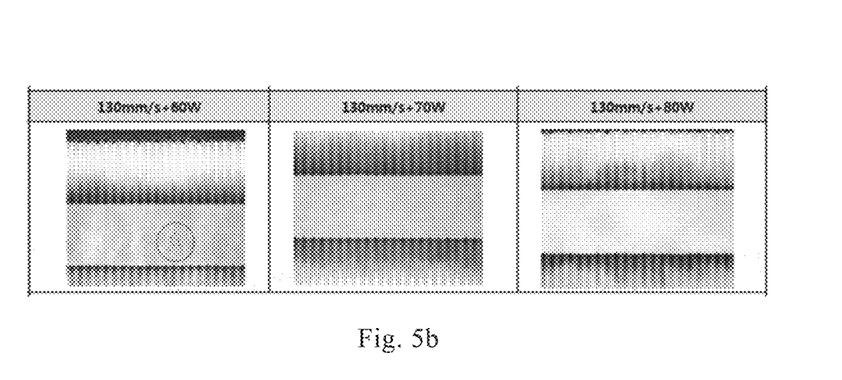
FIG. 5b is a schematic diagram illustrating a verification effect of a display substrate according to an embodiment of the present disclosure.

FIG. 5a is a schematic view illustrating a verification effect of a display substrate according to an embodiment of the present disclosure, and FIG. 5b is a schematic view illustrating a verification effect of a display substrate according to an embodiment of the present disclosure. In the display substrate related to FIG. 5a, a same group of signal lines 101 in at least a portion of the groups of the single liens 101 are coupled by a plurality of shorting bars 102, and the width of each shorting bar 102 is relatively small; in the display substrate related to FIG. 5b, each group of signal lines 101 are coupled by one shorting bar 102, and the width of the shorting bar 102 is relatively large; the total width of the shorting bars 102 coupled to the same group of signal lines 101 in the display substrate related to FIG. 5a is smaller than the width of the single shorting bar 102 coupled to the same group of signal lines 101 in the display substrate related to FIG. 5b. Therefore, as shown in FIGS. 5a and 5b, compared with the display substrate related to FIG. 5b, in the process of cutting the shorting bars 102 after the test is completed, the display substrate related to FIG. 5a generates less metal dust at a cutting position, so that circuit defects caused by the metal dust falling back to the bonding pad 103 along with airflow can be reduced or avoided, and the product yield can be improved. Moreover, in the process of cutting the shorting bars 102 in the display substrate related to FIG. 5a, the power of the cutting device is adjusted to 60 watts to achieve a good cutting effect, whereas in the process of cutting the shorting bar 102 in the display substrate related to FIG. 5b, a minimum of 70 watts of the cutting device is required to achieve a good cutting effect. It can be seen that by coupling the same group of signal lines 101 through a plurality of shorting bars 102 and making the width of each shorting bar 102 smaller, the power consumption can be reduced while a cutting rate is kept unchanged (for example, 130 mm/s) in the process of cutting the shorting bars 102 after the test of the display substrate is completed, so as to prolong the service life of the cutting device.

Figure 6A:
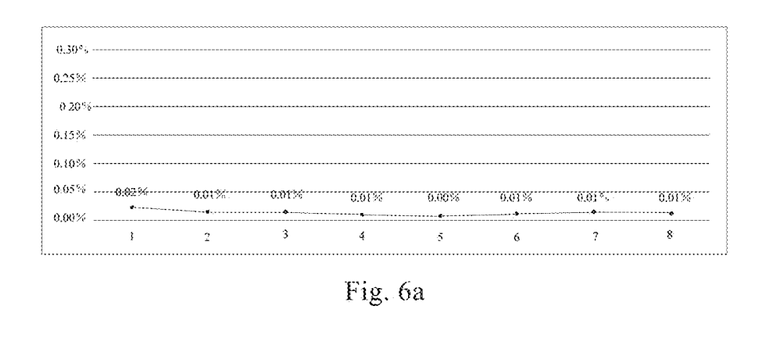
FIG. 6a is a schematic diagram illustrating a circuit defect occurrence rate of a display substrate according to an embodiment of the present disclosure.
Figure 6B:
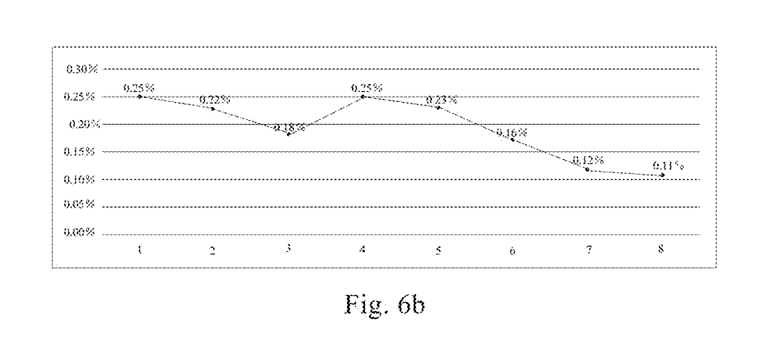
FIG. 6b is a schematic diagram illustrating a circuit defect occurrence rate of a display substrate according to an embodiment of the present disclosure.

FIG. 6a is a schematic diagram illustrating a circuit defect occurrence rate of a display substrate according to an embodiment of the present disclosure, and FIG. 6b is a schematic diagram illustrating a circuit defect occurrence rate of a display substrate according to an embodiment of the present disclosure. In the display substrate related to FIG. 6a, a same group of signal lines 101 in at least a portion of the groups of signal lines 101 are coupled by a plurality of shorting bars 102, and the width of each shorting bar 102 is relatively small; in the display substrate related to FIG. 6b, each group of signal lines 101 are coupled by one shorting bar 102, and the width of the shorting bar 102 is relatively large; the total width of the shorting bars 102 coupled to the same group of signal lines 101 in the display substrate related to FIG. 6a is smaller than the width of the single shorting bar 102 coupled to the same group of signal lines 101 in the display substrate related to FIG. 6b. Therefore, as shown in FIGS. 6a and 6b, the display substrate of FIG. 6a has a low occurrence rate of circuit defects, which is about 0.01%, and the display substrate of FIG. 6b has a high occurrence rate of circuit defects, which is unstable and ranges about 0.11% to about 0.25%. It can be seen that the display substrate of FIG. 6a can significantly reduce a circuit defect rate.

Figure 7:
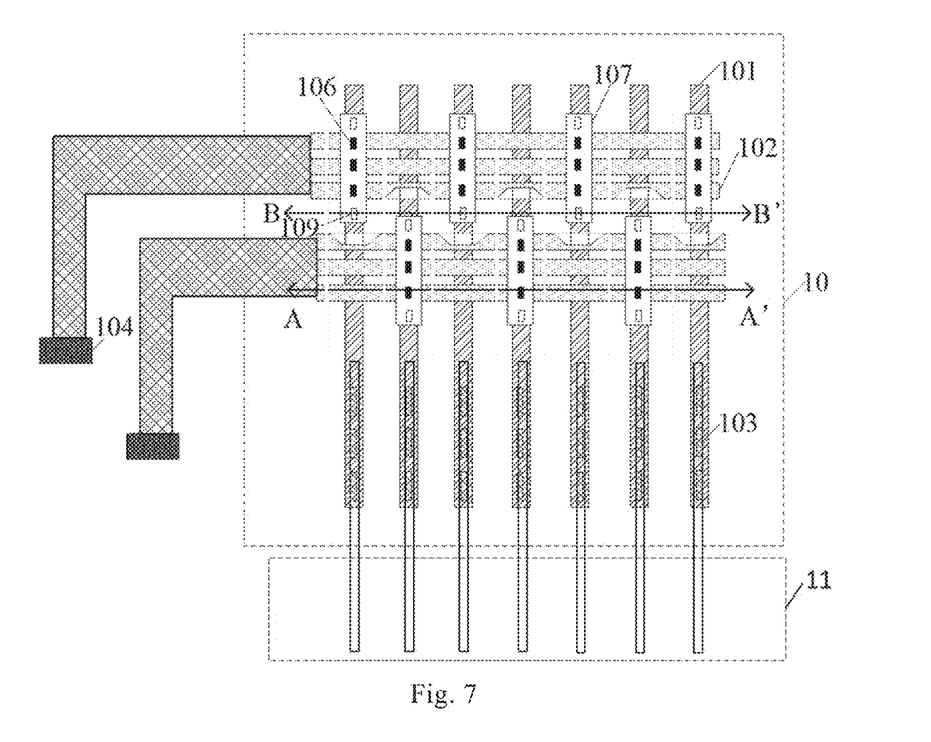
FIG. 7 is a schematic plan view illustrating a display substrate according to an embodiment of the present disclosure.

Based on the same concept as above, an embodiment of the present disclosure further provides a display substrate, which is formed by cutting shorting bars 102 coupled to a same group of signal lines 101 based on the display substrate provided in the previous embodiment, and FIG. 7 is a schematic plan view of a display substrate provided in an embodiment of the present disclosure, and as shown in FIG. 7, the display substrate includes a test area 10, a plurality of signal lines 101 are included in the test area 10, the plurality of signal lines 101 are divided into a plurality of groups, a same group of signal lines 101 in at least a portion of the groups of signal lines 101 are coupled through a plurality of shorting bars 102, each shorting bar 102 is coupled to the same group of signal lines 101, and each shorting bar 102 coupled to the same group of signal lines 101 includes a plurality of segments decoupled from each other, and each segment is coupled to one signal line 101.

In the embodiment, the plurality of shorting bars 102 coupled to the same group of signal lines 101 may be arranged in parallel.

In some implementations, the plurality of signal lines 101 may be arranged in parallel, each signal line 101 may be coupled to a display area 11 of the display substrate through a bonding pad 103, and specifically, each signal line 101 in the test area 10 may be bonded and coupled to a signal line in the display area 11 through the bonding pad 103, and meanwhile, one end of each shorting bar 102 may be led out and coupled to a test pad 104.

It can be understood that the difference from the display substrate provided in the foregoing embodiment is that, in the display substrate provided in the present embodiment, the shorting bar 102 coupled to the same group of signal lines 101 includes multiple segments decoupled from each other, each segment is coupled to one signal line 101, the multiple segments are formed by cutting the shorting bar 102 along gaps between adjacent signal lines 101 by a cutting device, and disconnection positions between the segments formed by specific cutting are shown as blanks in the shorting bar 102 in FIG. 7. Therefore, in the display substrate of the present embodiment, the signal lines 101 are decoupled from each other, so that driving signals can be provided to pixels in the display area 11 of the display substrate through the signal lines 101, thereby implementing the display function.

In some implementations, as shown in FIG. 7, in a case where the plurality of shorting bars 102 coupled to the same group of signal lines 101 are disposed adjacent to each other and in parallel, in the manufacturing process, the plurality of shorting bars 102 coupled to the same group of signal lines 101 may be formed through a single patterning process, so that the process difficulty can be reduced, and the manufacturing efficiency can be improved.

In some implementations, the shorting bar 102 may be of a straight line, a curved line, or other irregular line, which is not listed here.

In some implementations, referring to FIGS. 7 and 3, the signal lines 101 may be disposed in a same layer, the shorting bars 102 may be disposed in a same layer, the display substrate may further include an interlayer insulating layer 105 between the signal lines 101 and the shorting bars 102, and conductive parts 107 disposed corresponding to the signal lines 101, each of the conductive parts 107 may be coupled to the shorting bars 102 coupled to the same group of signal lines 101 and the corresponding signal line 101 through via holes 106, and the via holes 106 penetrate through the interlayer insulating layer 105 and the shorting bars 102. That is, the same group of signal lines 101 may be coupled to the corresponding shorting bars 102 through the conductive parts 107.

It should be noted that, in a case where the plurality of signal lines 101 are disposed in a same layer and the plurality of shorting bars 102 are disposed in a same layer, in the preparation process, the signal lines 101 in the same layer may be formed through a single patterning process, and the shorting bars 102 in the same layer may be formed through a single patterning process, so that the process difficulty can be reduced, and the preparation efficiency can be improved. The conductive part 107 is coupled with the shorting bars 102 coupled to the same group of signal lines 101 and the corresponding signal line 101 through the via holes 106, so that the shorting bars 102 can be effectively coupled with the same group of signal lines 101. It will be appreciated that the shorting bars 102 may also be protected by covering the shorting bars 102 with a protective layer 108 thereon, and thus the via holes 106 need to further penetrate through the protective layer 108. In addition, during the manufacturing process, a material of the interlayer insulating layer 105 may be silicon nitride, and the thickness thereof may be about 4000 angstroms in general. A material of the protective layer 108 may also be silicon nitride. It is understood that materials of the interlayer insulating layer 105 and the protection layer 108 may also be selected according to actual needs, so that film layers with corresponding thicknesses are formed, which are not listed here.

In some implementations, as shown in conjunction with FIGS. 7 and 4, both ends of the conductive part 107 may be respectively coupled to the corresponding signal line 101 through the redundant via holes 109 penetrating only the interlayer insulating layer 105.

In practical applications, no shorting bar 102 may be disposed at positions corresponding to both ends of the conductive part 107, and therefore, no protective layer 108 is required, and the conductive part 107 may be fixedly coupled to the signal line 101 through the redundant via holes 109 penetrating through the interlayer insulating layer 105, so as to ensure effective connection between the conductive part 107 and the signal line 101.

In some implementations, as shown in FIG. 7, for the shorting bars 102 adjacent to each other and coupled to the first group of signal lines 101 and the second group of signal lines 101 respectively, notches are provided at positions of an end of the shorting bar 102, coupled to the first group of signal lines 101, which is proximal to the conductive parts 107 coupled to the second group of signal lines 101.

It should be noted that, in the display substrate, in order to achieve effective fixing of the conductive part 107, both ends of the conductive part 107 may be fixedly coupled to the corresponding signal line 101 through the redundant via holes 109 penetrating only the interlayer insulating layer 105, however, such arrangement may easily cause a distance between the conductive part 107 and the shorting bar 102 adjacent thereto to be relatively short while achieving the fixed connection between the conductive part 107 and the corresponding signal line 101, and even the conductive part 107 may be overlapped with the shorting bar 102 adjacent thereto through the redundant via holes 109, thereby easily generating a circuit defect. By providing a notch at a position of the end of the shorting bar 102, coupled to the first group of signal lines 101, which is proximal to the conductive part 107 coupled to the second group of signal lines 101, the notch can increase the distance between the conductive part 107 coupled to the second group of signal lines 101 and the shorting bar 102 coupled to the first group of signal lines 101, so that the conductive part 107 coupled to the second group of signal lines 101 and the shorting bar 102 coupled to the first group of signal lines 101 can be prevented from being relatively close to each other and overlapped each other, and thus, a circuit defect can be prevented from occurring between the conductive part 107 coupled to the second group of signal lines 101 and the shorting bar 102 coupled to the first group of signal lines 101. It is understood that the notch may have a trapezoidal shape, or may have other shapes, which are not listed here.

In some implementations, a material of the conductive part 107 includes indium tin oxide.

It should be noted that the conductive part 107 may be made of indium tin oxide with a good conductivity. It is understood that the conductive part 107 may also be made of other semiconductor materials or metal materials with conductive properties, which are not listed here.

It should be noted that, in the present embodiment, the same group of signal lines 101 are coupled by a plurality of shorting bars 102, and the width of each shorting bar 102 (i.e., the dimension along the extending direction of the signal line 101) may range from about 17 micrometers to about 25 micrometers, taking a case where the same group of signal lines 101 are coupled by three shorting bars 102 arranged in parallel as an example, the width of each shorting bar 102 may be about 17 micrometers, and compared with the single shorting bar 102 having a width of about 73 micrometers and coupled to the same group of signal lines 101 in the previous embodiment, it can be seen that the total width of the three shorting bars 102 coupled to the same group of signal lines 101 in the display substrate provided by the present embodiment is significantly lower than the width of the single shorting bar 102 coupled to the same group of signal lines 101 in the display substrate of the previous embodiment, therefore, the area to be cut can be reduced during the process of cutting the shorting bars 102 after the test is completed, thereby reducing or avoiding a large amount of metal dust generated during the process of cutting, therefore, circuit defects caused by the metal dust falling back to the bonding pad 103 along with airflow can be reduced or avoided, and the product yield can be improved.

Based on a same concept as above, an embodiment of the present disclosure further provides a display device, which includes the display substrate, formed by cutting the shorting bars 102 coupled to the same group of signal lines 101 to disconnect the signal lines 101 from each other, as described in the previous embodiment, where the display device may be a mobile phone, a tablet computer, or a smart television, and the specific details of the display device are similar to those described in the above embodiment, and are not described again here.

In the display device provided by the embodiment, in the test area 10 of the display substrate, the same group of signal lines 101 are coupled through the plurality of shorting bars 102, the width of each shorting bar 102 is relatively small, and the total width of the shorting bars 102 is reduced, so that in the process of cutting the shorting bars 102 after the test of the display substrate is completed, the area to be cut can be reduced, a large amount of metal dust is prevented from being generated in the process of cutting, and thus, circuit defects caused by the metal dust falling back onto the bonding pad 103 along with airflow can be reduced or avoided, and the product yield can be further improved. Moreover, since the area to be cut is relatively small, the energy consumption can be reduced in the process of cutting, and the service life of the cutting device can be prolonged.

It should be noted that, although the embodiment of the present disclosure only shows that the signal lines 101 are divided into two groups, the signal lines 101 may be divided into three or more groups as needed, which is not specifically limited in the present disclosure; similarly, although the embodiment of the present disclosure only shows that each group of signal lines 101 are coupled by one or three shorting bars 102, each group of signal lines 101 may also be coupled by two, four or more shorting bars 102 as needed, and the present disclosure is not particularly limited thereto.

Moreover, "first" and "second" in the present disclosure are merely for distinguishing entities and do not denote importance or order; the layout in the display substrate (including the layout of the signal lines, the connection lines, the bonding pads, the test pads, and other elements) shown in the present disclosure is schematic, and various modifications and improvements may be made to the layout in the display substrate based on the concept of the present disclosure; moreover, the various embodiments and features thereof described above may be combined arbitrarily without conflict, based on the concept of the present disclosure.

It is to be understood that the above embodiments and implementations are merely illustrative of exemplary embodiments and implementations that have been employed to illustrate the principles of the present disclosure, which, however, is not to be taken as limiting of the present disclosure. It will be apparent to those skilled in the art that various changes and modifications can be made without departing from the spirit and scope of the present disclosure, and these changes and modifications are to be considered within the scope of the present disclosure.

The invention claimed is:

1. A display substrate, comprising a test area, the test area comprises a plurality of signal lines coupled with signal lines in a display area of the display substrate, the plurality of signal lines are divided into a plurality of groups, wherein,
   each group of signal lines in at least a portion of the groups are coupled through a plurality of shorting bars, and each shorting bar is coupled with a same group of signal lines,
   wherein the plurality of signal lines are disposed in a same layer, the plurality of shorting bars are disposed in a same layer,
   the display substrate further comprises an interlayer insulating layer and conductive parts, the interlayer insulating layer is located between the signal lines and the shorting bars, the conductive parts correspond to the signal lines, the shorting bars are located between the signal lines and the conductive parts, and each of the conductive parts is coupled with the shorting bars coupled to the same group of signal lines and the corresponding signal line through via holes penetrating through the interlayer insulating layer and the shorting bars.

2. The display substrate of claim 1, wherein the shorting bars coupled to the same group of signal lines are disposed adjacent to each other and in parallel.

3. The display substrate of claim 1, wherein each of the signal lines extends along a first direction, the plurality of signal lines are arranged in parallel along a second direction, and each of the shorting bars extends along the second direction, the first direction crossing the second direction.

4. The display substrate of claim 3, wherein each of the shorting bars has a width, along the first direction, ranging from about 17 microns to about 25 microns.

5. The display substrate of claim 1, wherein both ends of each of the conductive parts are coupled to the corresponding signal line through redundant via holes penetrating only the interlayer insulating layer, respectively.

6. The display substrate of claim 5, wherein for the shorting bars adjacent to each other and coupled to a first group of signal lines and a second group of signal lines respectively, notches are provided at positions of the end of the shorting bar, coupled to the first group of signal lines, which is proximal to the conductive parts coupled to the second group of signal lines.

7. The display substrate of claim 1, wherein a material of the conductive parts comprises indium tin oxide.

8. A display substrate, comprising a test area, the test area comprises a plurality of signal lines coupled to signal lines in a display area of the display substrate, the plurality of signal lines are divided into a plurality of groups, wherein,
   each group of signal lines in at least a portion of the groups are coupled through a plurality of shorting bars, each shorting bar is coupled to a same group of signal lines, each of the shorting bars coupled to a same group of signal lines comprises a plurality of segments decoupled from each other, and each segment is coupled to one of the signal lines, wherein the plurality of signal lines are disposed in a same layer, the plurality of shorting bars are disposed in a same layer, the display substrate further comprises an interlayer insulating layer and conductive parts, the interlayer insulating layer is located between the signal lines and the shorting bars, the conductive parts correspond to the signal lines, the shorting bars are located between the signal lines and the conductive parts, and each of the conductive parts is coupled to the shorting bars coupled to the same group of signal lines and the corresponding signal line through via holes penetrating through the interlayer insulating layer and the shorting bars.

9. The display substrate of claim 8, wherein the plurality of shorting bars coupled to the same group of signal lines are disposed adjacent to each other and in parallel.

10. The display substrate of claim 8, wherein each of the signal lines extends along a first direction, the plurality of signal lines are arranged in parallel along a second direction, and each of the shorting bars extends along the second direction, the first direction crossing the second direction.

11. The display substrate of claim 8, wherein a width of each of the shorting bars along the first direction ranges from about 17 microns to about 25 microns.

12. The display substrate of claim 8, wherein adjacent segments of each of the shorting bars are decoupled from each other between the signal lines adjacent to each other.

13. The display substrate of claim 8, wherein both ends of the conductive part are coupled to the corresponding signal line through redundant via holes penetrating only the interlayer insulating layer, respectively.

14. The display substrate of claim 13, wherein for the shorting bars adjacent to each other and coupled to a first group of signal lines and a second group of signal lines respectively, notches are provided at positions of the end of the shorting bar, coupled to the first group of signal lines, which is proximal to the conductive parts coupled to the second group of signal lines.

15. The display substrate of claim 8, wherein a material of the conductive part comprises indium tin oxide.

16. A display device, comprising the display substrate of claim 8.

* * * * *